United States Patent [19]

Nielsen

[11] Patent Number: 4,690,670

[45] Date of Patent: Sep. 1, 1987

[54] CENTRIFUGE TUBE HAVING REUSABLE SEAL

[76] Inventor: Steven T. Nielsen, 1126 W. Knickerbocker Dr., Sunnyvale, Calif. 94087

[21] Appl. No.: 818,524

[22] Filed: Jan. 10, 1986

[51] Int. Cl.⁴ .............................................. B04B 5/02
[52] U.S. Cl. .................................... 494/16; 215/276; 422/72; 422/102; 494/17
[58] Field of Search ............... 494/16, 17, 18, 20, 494/85, 38, 39, 35; 137/212; 222/400.7, 478, 464; 422/101, 102, 72; 215/276, 274; 220/288, 289, 309, 319; 285/334.5, 382.4

[56] References Cited

U.S. PATENT DOCUMENTS

| | | | |
|---|---|---|---|
| 911,225 | 2/1909 | Flach | 222/400.7 |
| 1,065,233 | 6/1913 | Gittinger | 137/212 |
| 3,459,369 | 8/1969 | Marks | 494/16 |
| 3,465,957 | 9/1969 | Brandt | 494/16 |
| 4,301,963 | 11/1981 | Nielsen | 494/16 |
| 4,511,349 | 4/1985 | Nielsen | 494/16 |
| 4,537,320 | 8/1985 | Nielsen | 494/276 |

*Primary Examiner*—Robert W. Jenkins
*Attorney, Agent, or Firm*—Thomas S. MacDonald; Alan H. MacPherson; Paul J. Winters

[57] ABSTRACT

A screw plug self-taps itself into an open filler stem of a thin plastic cylindrical centrifuge tube to press an underside of the plug against the annular top surface of the stem after the solutions to be centrifuged have been placed in the tube to seal the tube. A support crown may support the stem during the screw plug insertion into the stem and supports an upper portion of the tube adjacent the stem when the tube is inserted in a centrifuge rotor. Auxiliary seals may also be provided to ensure sealing of the tube stem. An annular fractionating plug is screwable into the tapped aperture in the stem after centrifuging, to remove the centrifuged tube contents.

17 Claims, 16 Drawing Figures

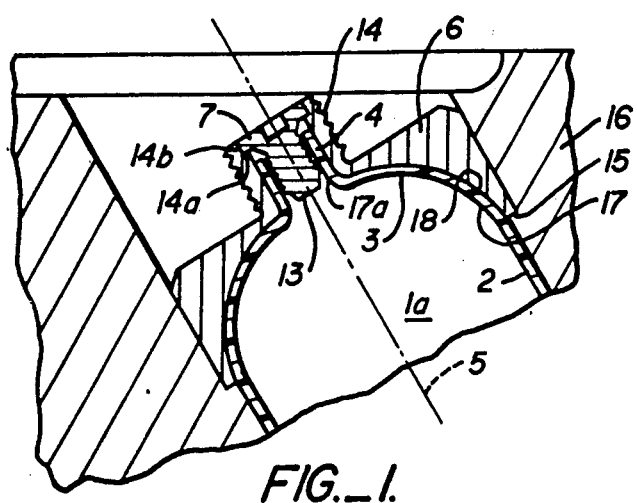
FIG._1.
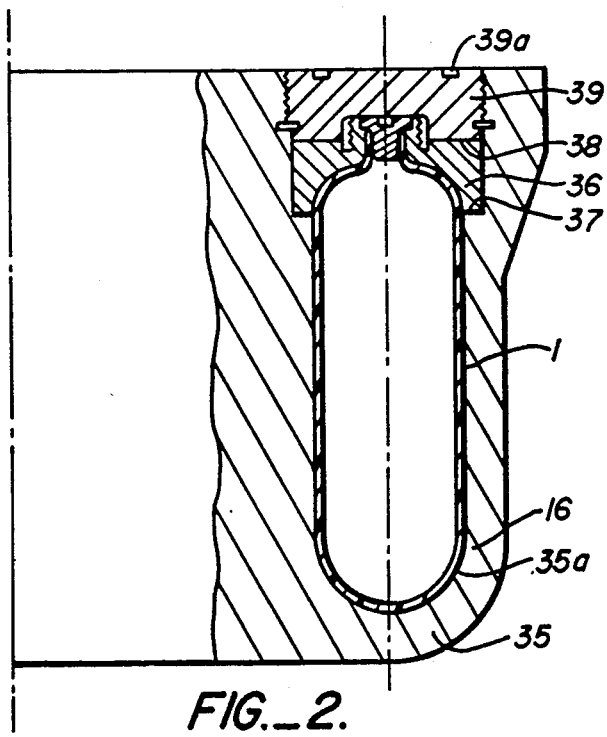
FIG._2.
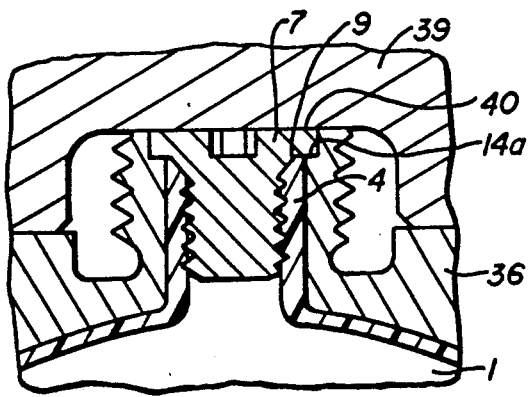
FIG._3.
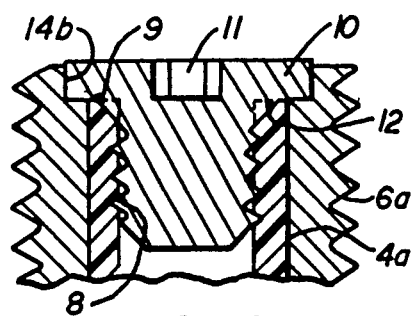
FIG._4.
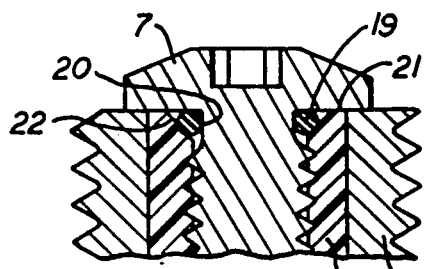
FIG._5.
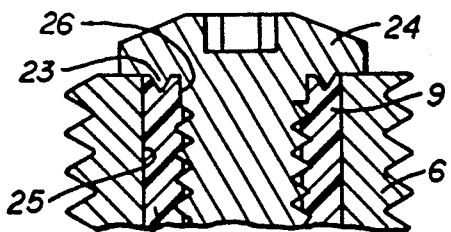
FIG._6.
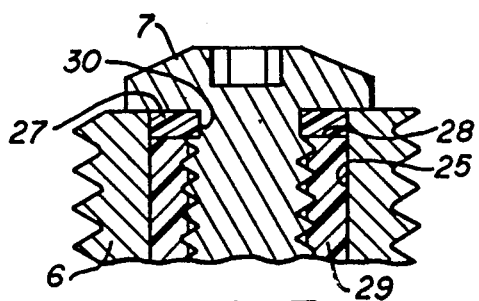
FIG._7.
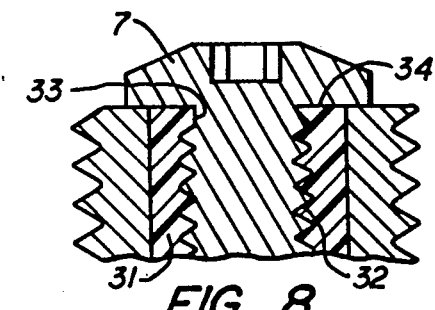
FIG._8.

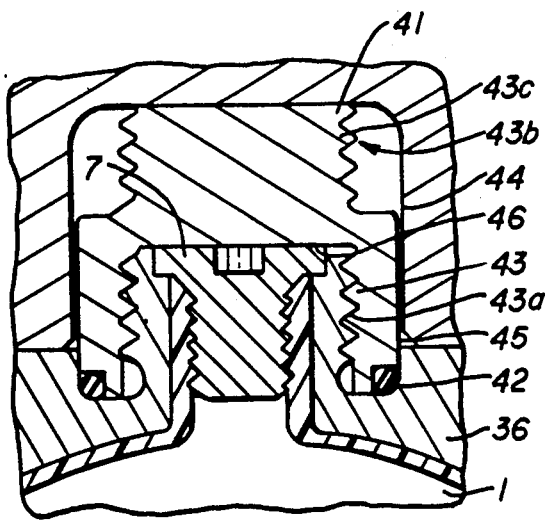

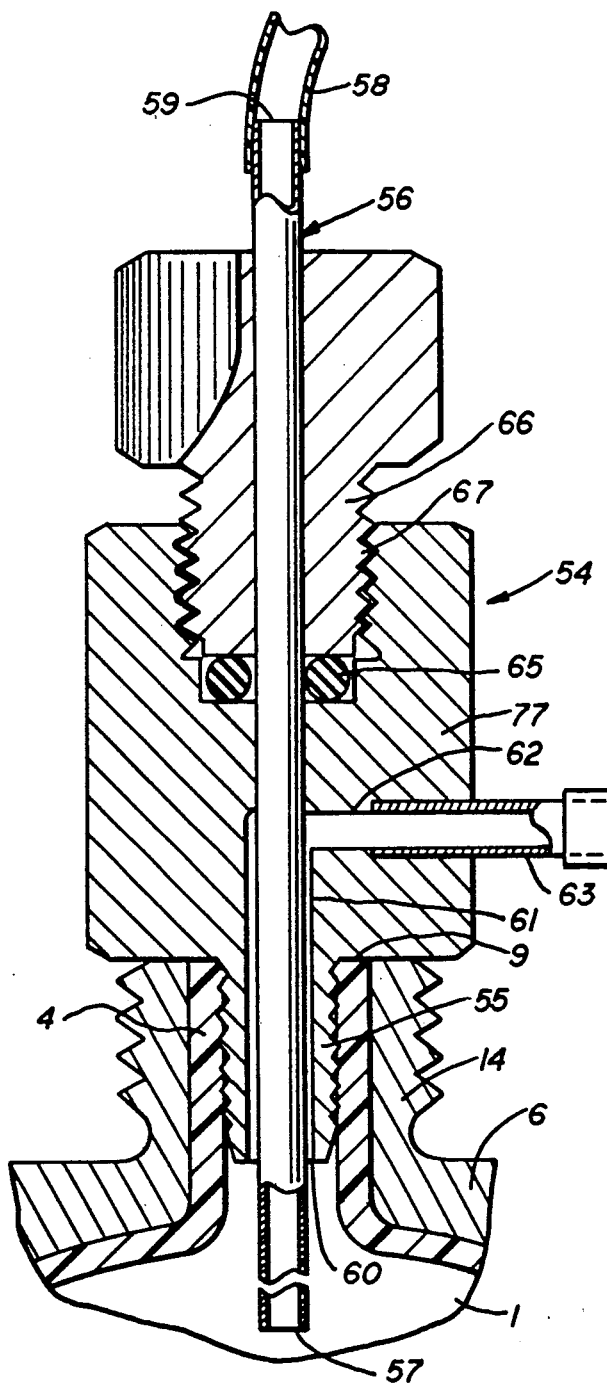
FIG._13.
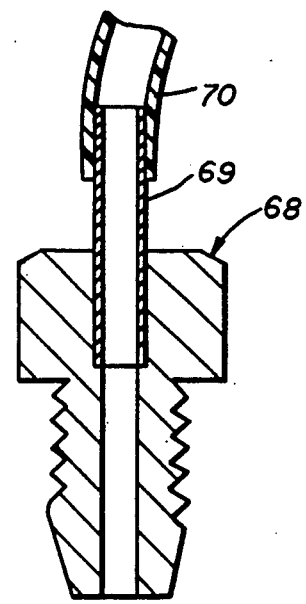
FIG._14.
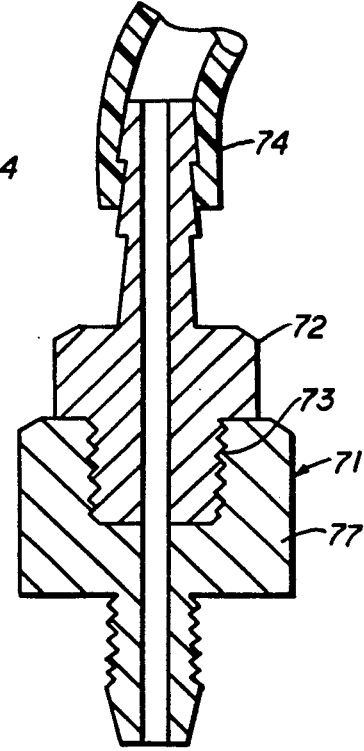
FIG._15.

CENTRIFUGE TUBE HAVING REUSABLE SEAL

FIELD OF THE INVENTION

The present invention is directed to centrifuge tubes and associated sealing means for use with ultracentrifuge apparatus, and more particularly, relates to a thin wall, flexible centrifuge tube and associated sealing mechanism and to means for removal of the liquid contents from the tube.

BACKGROUND

The need to place a liquid sample into a centrifuge rotor and subsequently remove it after centrifugation has lead to the development of many types of tubes and associated means of sealing the tubes. The field of ultracentrifugation where rotational speeds may range from 20,000 to over 100,000 revolutions per minute with corresponding g-fields from 50,000 to over 650,000 has caused the development of principally two types of tube sealing methods: mechanical and hermetical or heat seal. Sealing methods have been refined to meet the demands of increasing speeds, g-fields and the corresponding hydrostatic pressures generated inside the tubes. Often times the development of a particular sealing mechanism has resulted in an adequate seal but has encumbered the user of the centrifuge rotor and tube with an awkward method consisting of complicated and costly hardware to make the seal. A discussion of the many forms of seals is presented in S. T. Nielsen, "Centrifuge Tube Having Removable Crown and Swage Fitting", U.S. Pat. No. 4,537,320.

In U.S. Pat. No. 4,537,320, the sealing process is simplified and requires a minimum of special tools. A centrifuge tube seal is achieved by an outward swaging of a protruding stem by means of a conical seal plug seat against a corresponding conical surface of a support crown. Various B means are described for holding the flexible protruding stem in position while the swaged seal is accomplished. A swaged compression seal is achieved by the application of torque to the swage plug by a simple wrench. One limitation that has been realized with this method and article is the practical limitation on size of the components as the invention is applied to the many smaller sizes of tubes and centrifuge rotors. Because the number of existing rotors in the field is vast, it is desirable that a particular centrifuge tube and seal mechanism be designed for use in existing centrifuge rotors. Existing rotors generally have a limited head space between the top of the tube hole and the lid of rotor as this space continues to be designed for conventional tube caps as described in L. C. Marks, "Centrifuge Test Tube Cap", U.S. Pat. No. 3,459,369. It is generally desirable to maximize the internal volume of a centrifuge tube by minimizing the volume of a given seal assembly. The seal plug and crown plug assembly described in U.S. Pat. No. 4,537,320 has found practical application in such a way as to make the seal plug a common size with varying support crowns for all the rotors in which it is used. Unfortunately, this approach has lead to tubes with approximately 10% less internal volume than the conventional capping or sealing methods. The tube stem has been kept a common size so that the user can standardize the types of syringes and loading procedures used. The result has been that there is a practical minimum size where the standard seal plug can be used without the design of smaller tube stems and seal plugs. The swage seal has been applied to tube diameters of ⅜ inch nominal and larger. For tube sizes significantly smaller than ⅜ inch in diameter, for example ¼ inch in diameter, swage seal designs would require smaller, nonstandard tube stems, seal plugs and corresponding support crowns so that the seal assembly could be contained within an existing centrifuge rotor with a fixed head space. Because the swage seal is accomplished through an outward swaging of the tube stem, the diameter of the seal surface is larger than the original unswaged stem, B and the support crown and seal plug are correspondingly larger than the stem diameter. Application of this seal approach to smaller diameter tubes would require small stem diameters and would make filling of the tube quite difficult. If these components were developed for smaller diameter tubes, there would come a point where the features of the swage seal assembly would become very small and in some cases delicate or difficult to fabricate. Further, in practice it is has been found that there is a limit to the number of times a tube can be reliably unsealed and resealed since abrasion of the swaged seal surface of the tube occurs at each reuse.

The hermetical or heat sealed tube described in S. T. Nielsen, "Integral One-Piece Centrifuge Tube", U.S. Pat. No. 4,301,963 requires the application of heat, the use of relatively complex sealing instruments and hardware that can only be used once since the integral stem which is melted during the sealing process is cut off after centrifugation to gain access to the contents of the tube. Furthermore, problems in heat sealing may occur and any attempts to reseal the unused tube are often unsuccessful because additional, integral stem material is not available to reestablish the seal. If a sealing error is made, the contents of the tube, which may consist of many layers of density gradients and biological samples must be tediously removed and transferred to another tube for a second attempt at sealing with attendant loss of time, possible contamination or loss of sample and added cost.

A method for a mechanical tube seal has been developed by the E. I. du Pont de Nemours Co., Inc. of Wilmington, DE, and displayed under the trademark of "Crimp Seal". Like the hermetically sealed tube, it is designed to be a one-time use seal. A flexible plastic tube stem is plugged with a rubber bushing which extends into the tube stem and a ductile aluminum cap is placed over the top of the rubber bushing and extends down over the sides of the tube stem. A crimping device permanently deforms the aluminum cap against the tube stem causing the rubber bushing to be compressed and permanently constrained on its sides and top. The compression and interference fit of the rubber bushing with respect to the inside of the tube stem is said to be great enough to cause a liquid seal during centrifugation. The crimping process is very similar to that of a septum sealer which is used to crimp rubber septums to the top of glass vials for the storage of chemical and biological samples. The Crimp Seal in ultracentrifugation is considered to be a one-time seal. It would be most difficult to remove the ductile aluminum cap and rubber bushing which may be significantly and permanently deformed. If an insufficient crimp is applied because of improper adjustments of the crimping collet, it is difficult to cut away the aluminum cap without shaking the tube which could disturb the carefully layered density gradients and biological samples. Generally, as with the hermetically sealed tube, errors in the sealing process require the cutting way of the stem or puncturing of the tube, and the subsequent transfer of the tube contents to another tube for another attempt at sealing. In any case, even if a successful seal is made and centrifugation completed, retrieval of the tube contents is made by cutting the stem away.

SUMMARY

For thin wall centrifuge tubes, it is particularly desirable to provide a reliable and reuseable seal. A reuseable seal has the advantages of reducing the cost of laboratory testing and allowing the user to regain access to the tube without preventing later reuse of the tube. It is also desirable to provide a seal without the application of heat which may damage heat sensitive biological or other materials. In a given rotor tube, it is desirable to maximize the volume of sample. It is desirable to provide a means of sealing which uses simple, conventional tools so that sealing can be accomplished quickly and with a minimum investment in hardware. Because rotor tubes are frequently transferred between centrifuges and laboratories, it is an advantage to provide completely portable sealing tools and undesirable to provide a sealing instrument which is large and/or must serve as a fixed workstation. The ability to adapt a seal plug to a wide range of tube diameters and existing rotor tube designs minimizes the need to provide special sealing assemblies for each size of tube stem, including the very small tubes of diameters less than ½ inch. All of the above objects are addressed by the centrifuge tube with reuseable seal of the present invention.

The present invention includes a centrifuge rotor tube which terminates at its open end with a filler stem having a central aperture. A stem end annular sealing surface is provided and a support crown to positioned around the stem outer periphery to support at least a portion of the stem. A headed screw plug is inserted into the stem aperture in either a prethreaded mode or a self-tapping mode. When the plug is screwed into the stem central aperture, an underside, preferably conical, of the screw head compresses the stem end annular sealing surface while the support crown supports the stem from expanding outwardly. A counterbore in the crown surrounds the screw head so as to keep the screw head from shifting laterally outward during centrifugation, particularly in higher force rotors. The support crown, screw plug and tube may be withdrawn as a unit from the centrifuge. A further feature of the invention is to utilize the resultant tapped central aperture of the tube stem for mounting a fractionation plug to remove centrifuged liquid sample(s) from the centrifuge tube. Embodiments of the fractionation plug may or may not employ the same support crown utilized in sealing the tube during centrifuging of the tube contents.

BRIEF DESCRIPTION OF THE DRAWINGS

FIG. 1 is a partial cross-sectional view of a centrifuge tube placed in a fixed-angle rotor and having a seal formed by a screw plug against the tube and support crown.

FIG. 2 is a partial cross-sectional view of a centrifuge tube, a screw plug and a support crown placed in a vertical tube rotor.

FIG. 3 is an enlarged partial cross-sectional view of the seal of FIG. 2.

FIG. 4 is an enlarged partial cross-sectional view of the seal of FIG. 1.

FIG. 5 is a partial cross-sectional view of an alternative embodiment of the present invention showing an elastomeric O-ring seal in the seal region and modified screw head.

FIG. 6 is a partial cross-sectional view of a further embodiment showing an annular V-ring forming a seal.

FIG. 7 is a partial cross-sectional view of a further embodiment showing an elastomeric gasket in the seal region.

FIG. 8 is a partial cross-sectional view of a further embodiment showing an independently formed thread in the neck of the tube.

FIG. 9 is a partial cross-sectional view of another embodiment showing a secondary seal formed by a cap and O-ring seal.

FIG. 10 is a partial cross-sectional view of an alternative embodiment showing a screw plug and support crown positioned in a fixed-angle rotor.

FIG. 11 is a partial cross-sectional view of a variant B of FIG. 10 showing a screw plug fitted with an elastomeric O-ring in the seal region.

FIG. 12 is a side view of a tube and crown with mounted fractionation plug.

FIG. 13 is a partial cutaway cross-sectional side view of a mounted fractionation plug.

FIG. 14 is a cross-sectional side view of a second embodiment of a fractionation plug.

FIG. 15 is a cross-sectional side view of another embodiment of a fractionation plug.

FIG. 16 is a cross-sectional side view of an embodiment of the invention using a separate plate vise for supporting the tube.

DETAILED DESCRIPTION

The preferred embodiment of the centrifuge tube 1 is shown in FIG. 1 with a cylindrical section 2 and ovoidal or spherical dome-like transition region 3 which provides a reduction in diameter of the tube to the diameter of the stem 4, and all of which are centered with respect to a common longitudinal axis 5. The underside surface 17 of a support crown 6 rests against the top mating surface 18 of the transition region and also serves to support the neck of the tube at 17a. The transition region may be any convenient shape and preferably makes maximum the internal volume 1a of the tube and allows smooth passage of fluid by the walls of its internal surface during sample removal. A hemispherical transition satisfies the first condition and a conical transition the latter. In some applications, an approximate elliptical shape rather than a hemisphere is necessary to contain all of the seal features within the limited, fixed space between the rotor counterbore 15 and the lid (not shown) of rotor 16. A screw plug 7 provides a self-tapping thread 8 (FIG. 4) as it is screwed into the stem of the tube. The screw plug may be made of a corrosion resistant metal such as stainless steel or titanium or may be made of a rigid corrosion resistant plastic such as nylon, although other plastic materials are acceptable.

As seen in FIG. 4, the screw plug has a head 10 and means of applying sufficient torque to the screw plug through a hexagonal socket 11. Other means may be provided on the head extension surface to apply torque to the screw plug such as a slotted head or external flats. The outside diameter and thread pitch of the screw plug may vary according to the hardness and mechanical properties of the tube material. Generally, a more rigid plastic tube material such as polyester, cellulose ester or polycarbonate requires less thread interference or engagement to maintain a seal than more ductile tube materials such as polypropylene or polyallomer. The seal is made by compression of the annular flat top surface 9 of the tube stem perpendicular to the vertical axis of the tube stem by the underside surface 12 of the head of the screw plug bottoming in the central aperture 4a of the stem 4. In the preferred form of the invention, the underside surface 12 is conical, which conical surface compresses the tube stem inner peripheral edge which displaces to conform to the conical head undersurface and compresses more than if a flat underside surface, as in FIG. 5, is used. The force to retain the screw plug in the tube stem and to resist the combined counteracting forces of compression of the tube stem at the seal surface and the hydrostatic forces from the liquid(s) in the tube upward against the bottom 13 of the screw plug (FIG. 1) is achieved by the engagement of a self-tapping thread of the screw plug to the inside diameter of the tube stem. The compressible stem material of the tube is peripherally supported on its exterior cylindrical surface by a support crown 6, and the seal is maintained during the application of extremely high stresses during centrifugation. The support crown has an externally threaded top annular projection 14 to provide engagement of a suitable tool to pull the assembly consisting of the tube, its liquid contents, screw plug and support crown as a unit from the rotor after centrifugation. The support crown is positioned against a counterbore shoulder 15 of the fixed-angle centrifuge rotor 16. Numeral 6a denotes optional threads for inserting and removing the crown into and from the rotor. The support crown is preferably made of metal with a high strength-to-weight ratio such as aluminum or titanium. In some lower speed ultracentrifuge rotors, the stresses are less and the support crown can be made of rigid plastic materials such as modified polyphenylene oxide or polyacetal.

An important feature of this invention is the reusability of the seal. The generation of threads into an originally smooth inside tube diameter wall bounding the central aperture of the stem by a self-tapping screw plug allows the tube stem to be simple in design and easy to manufacture. Removal of the screw plug and subsequent replacing of the screw plug when reusing the tube is easily accomplished because the tube stem has previously formed internal threads from the first insertion and self-tapping of the screw plug.

Another important feature of this invention is that the seal is easily accomplished on the annular top surface or annular inner peripheral top edge (FIG. 4) of the tube stem which is relatively small in surface area. Because these annular areas are small, the application of a given downward force by the screw plug by means of the self-tapping thread engagement in the stem applies a high compressive stress to the annular areas thereby causing a seal. Because no outward swaging and displacement of the tube stem material is required, the necessary compressive force is easily generated by the screw plug within a confined space. A common screw plug and tube stem diameter can be applied to small as well as large diameter tubes, and SB the variety of change hardware is kept to a minimum. Stem surface 9 extends from about 0 to 0.3 millimeters above crown counterbore shoulder 14a so that the plug underside surface 12 compresses stem surface 9. The remainder of the stem is peripherally supported by the annular projection 14.

As seen in FIGS. 1–4, the flat headed screw plug of this preferred embodiment seats into a counterbore 14b of crown 14. The vertical sidewalls of the counterbore surrounds the screw plug head periphery. These sidewalls prevent the screw head from shifting outward during centrifugation and is particularly desirable in higher force rotors.

Still another important feature of this invention is the ability to fill the tube to its maximum volume. The liquid meniscus can be made coincident with the bottom of the screw plug as no margin or head space is required as an insulating zone to the biological specimen which may reside on the top of the fluid. The tube volume is made maximum and the deformation of the tube during centrifugation is made minimum.

Another important feature of this invention is the use of simple tools which are common in the laboratory. A standard hexagonal key wrench is the only tool required to make the seal when the screw plug is torqued down into the stem of the tube. The means of achieving the seal are completely portable and inexpensive. All heat sealing and crimping devices are eliminated and special positioning blocks, seal formers and restraining caps are not required.

FIG. 5 illustrates an alternative embodiment of the screw plug seal shown in FIG. 4. The screw plug 7 has a flat underside and an O-ring 19 is positioned on a thread relief diameter 20 of the screw plug. Although a compression seal is established on the top 21 of the tube stem by a downward compressive force of the screw plug, the O-ring provides an additional secondary seal by its compressive force acting against a chamfer 22 on the inside diameter of the tube stem.

FIG. 6 illustrates another embodiment of the screw plug seal shown in FIG. 4. An integral annular V-ring 23 extends from a flat underside surface of the head of a screw plug 24 and is forced by compression into the top surface of the tube stem 9 as the screw plug is screwed down into the neck of the tube. The stem material adjacent to the V-ring is compressed firmly against the inside diameter 25 of the support crown and is simultaneously captured between the V-ring and the sides 26 of the screw plug.

FIG. 7 illustrates another embodiment of the present invention. An elastomeric gasket 27 is captured under the flat head of the screw plug and is compressed simultaneously against the top surface 28 of a tube with a shorter stem 29, the inside diameter of the support crown 6, and the thread relief 30 of the screw plug.

FIG. 8 illustrates yet another embodiment of the present invention. The tube stem 31 has a previously formed thread 32 on its inside diameter 33. The screw plug need not self-tap the stem threads. Some plastic materials may be unsuitable for self-tapping and require the formation of threads by an independent machining process. Such pretapped stem may be employed with each of the screw plugs of the invention. The seal is accomplished on the top surface 34 of the stem by compression of the stem material by the underside of the head of plug 7.

In FIG. 2 a tube 1 and sealing assembly is shown with tube bottom 16 positioned in a cavity 35a of vertical rotor 35 In this application, a support crown 36 is proportioned in such a way as to completely fill the space between the counterbore shoulder 37 and lower surface 38 of a rotor hole plug 39 such that upward movement of the support crown is prevented. Plug 39 is part of a typical prior art rotor. Suitable apertures 39a may be provided on the plug 39 top surface for insertion of a spanner wrench removal tool to seal and remove plug 39. FIG. 3 is an enlarged view of the seal region shown in FIG. 2 illustrating that the top surface 40 of the screw plug is constrained from upward movement by the rotor hole plug.

FIG. 9 shows an embodiment of the seal in FIG. 3 where a secondary seal cap 41 is positioned over the screw plug and compresses an O-ring 42 to provide a secondary seal to the primary seal formed by the screw plug against the top surface of the tube stem. The O-ring is optional. The secondary seal cap engages the external threads 43 of the support crown by means of corresponding internal threads 43a. The external threads 43b in the support crown are used to secure a tool for removal of the sealed tube assembly from the rotor hole. Means are provided for applying torque to the secondary seal cap such as a knurled surface 44 on the lower cylindrical portion 45. The secondary seal cap constrains the top surface of the screw plug on its underside 46. The external threads 43b on the upper cylindrical portion 43c can also be used to remove the entire assembly from the rotor The same tool can be used on both threads 43a and 43b for removal of the cap 41 and crown 36.

FIG. 10 shows centrifuge tube 1 positioned in a fixed angle rotor with a support crown 47 and a screw plug 48. The head 49 of the screw plug is completely contained by a corresponding surface 50 on the underside of the support crown. The seal is achieved on the top surface 51 of the stem of the tube. The screw plug is preferably made of a rigid plastic material such as nylon, but other rigid plastics would be acceptable. The plastic screw plug is sufficiently low in density to float in the liquid contents of the tube or to have an insignificant effect on the balance of the rotor should it centrifuge to the bottom of the rotor. In this embodiment the screw plug does not rest on or just above the top surface of the support crown and is not restricted from downward movement should the tube leak in an unforeseen manner. In the FIGS. 10 and 11 embodiments, the support crown is placed over the stem and screw plug after the screw plug has been screwed into the stem. The bottom peripheral edge 47a of the crown 47 abuts the counterbore shoulder 16a in the aperture 16b of the centrifuge rotor 16.

FIG. 11 shows an alternate embodiment to the seal assembly shown in FIG. 10 where an O-ring 52 is positioned against a chamfer 53 in the tube stem to facilitate the primary seal between the head of the screw plug and the top of the tube stem 54.

After centrifugation, with respect to the FIG. 1 assembly, a suitable removal tool is fastened such as by threading to the threaded projection 14 of the support crown and the assembly consisting of the tube, support crown and seal plug is removed from the rotor. In the FIG. 9 assembly, the secondary plug is first unthreaded. The seal screw plug is unscrewed with another tool and the stem of the tube becomes open for removal of the liquid contents. The liquid sample can be removed by a variety of conventional means including squeezing, inserting pipettes through the top opening, puncturing through the bottom or side wall of the tube, or by connection to an independent fraction recovery device.

A typical device for use with heat-sealed or crimp-sealed tubes or open-top centrifuge tubes is complex and requires the tube to be supported simultaneously on the bottom and top. In this prior art, the tube is clamped between a fixed bottom support plate and a top collection plate or cone which is lined with an elastomeric gasket to provide a seal against the cut stem of the heat-sealed or crimp-sealed tube or the top of an open-top tube. In any case, a large support stand is required and the seal is not always maintained because of the distortion of the top portion of the tubes during centrifugation.

Another feature of the present invention is to provide a simple and reliable seal point for the attachment of a sample removal or fractionation plug as shown in FIG. 12. The fractionation plug 54 rests on top of the support crown 6 and is attached to the tube 1 by threaded engagement to the tapped central aperture of the stem 4. Similarly, the fraction plugs shown in FIGS. 14 and 15 can be attached to the tube and support crown assembly.

The fractionation plug shown in more detail in FIG. 13 has an annular housing 77 with a threaded boss 55 which engages the previously tapped stem of the tube. The tube stem was previously tapped prior to or at the initial insertion of the self-tapping seal plug prior to centrifugation. Again, a seal is made on the top surface 9 of the tube stem. A thin wall longitudinally translatable tube 56 preferably made of corrosion resistant stainless steel extends through the fractionation plug and into the centrifuge tube. It is of sufficient length to allow positioning of the bottom end 57 at any point or level in the interior length of the centrifuge tube. By pumping a fluid through a flexible plastic tube 58 attached to the top end 59 of the thin wall tube and into the centrifuge tube, the liquid sample is displaced upwards where it exits the centrifuge tube and enters an annular passage 60 formed by the thin wall tube passing through a bore 61 in the fractionation plug. The annular passage is connected to a side port 62 which has inserted into it another thin wall tube 63. The displaced fluid exits the fractionation plug through a flexible plastic tube 64 for recovery and analysis. In another method of sample retrieval, a displacement fluid such as neutral oil is pumped into the flexible tube 64 through the side port and into the centrifuge tube from the top, causing liquid to be displaced downward until it reaches the suitably positioned bottom end 57 of the thin wall tube 56 where it then flows upward through the fractionation plug and out through the flexible tube 58. An O-ring 65 provides a seal against the thin wall tube when compressed by the bushing 66. Turning of the bushing causes the engagement of threads 67 in the fractionation plug and applies force to the top of the O-ring which displaces radially inwards making a seal against the thin wall tube. The fractionation plug with an entry and exit tube allows sample recovery through the top of the centrifuge tube without puncturing and therefore allows the reuse of the tube. This is particularly beneficial to laboratories which analyse hazardous materials where hypodermic needles are not allowed because of the risk of a punctured finger of the laboratory technician.

In another embodiment of the present invention, FIG. 14, a fraction plug 68 can be screwed into the tapped stem of the centrifuge tube to provide a single fluid entry or exit point. A thin wall stainless steel tube 69 is permanently fixed to the top of the fraction plug and a flexible plastic tube 70 is attached to the end of the thin wall tube. The centrifuge tube is usually punctured at some point with a hypodermic needle to provide the second entry or exit point for the fluid. The act of puncturing prevents the reuse of the centrifuge tube in this embodiment.

FIG. 15 shows another embodiment of a fraction plug 71 where a barbed fitting 72 is attached by threads 73. A flexible plastic tube 74 is connected to the top of the barbed fitting. The barbed fitting is preferably constructed of a corrosion resistant plastic material such as polypropylene or fluoropolymer.

In the forms of fractionation and fraction plugs shown in FIGS. 13, 14 and 15, the material of construction can be corrosion resistant metals such as stainless steel or plastics such as polyacetal, polypropylene or fluoropolymers. If it is necessary to see the top hemispherical portion of the centrifuge tube, the support crown which is usually made of an opaque metal such as aluminum can be removed and replaced by a transparent crown made of a material such as polycarbonate or acrylic. The transparent crown is typically used for sample recovery procedures and not for centrifugation. The support crown used in centrifugation can be easily removed from the stem of the tube because there is no swaged seal of the tube stem.

In an alternative embodiment of the present invention, the tube with the support crown removed is transferred to a plate vise 75 shown in FIG. 16. The tube is inserted through the plate vise from the underside and the fractionation of fraction plug is screwed into the tube stem from the top thereby holding it in place. The plate vise is fixed to a bench 76 or stand. The plate vise contacts the tube only in the stem region and the top hemisphere of the tube is visible during sample recovery. The plate vise can be constructed of a transparent plastic or opaque metal.

The above description of embodiments of this invention is intended to be illustrative and not limiting. Other embodiments of this invention will be obvious to those skilled in the art in view of the above disclosure.

I claim:

1. A centrifuge tube and seal comprising:
a tube having a body portion for holding contents to be centrifuged and a partially enclosed upper end, said upper end terminating in a filler stem,
said stem having a central aperture and an exterior end annular sealing surface;
a support crown fitting over said filler stem for supporting at least a portion of said stem below said sealing surface; and
a screw plug screw inserted into said central aperture of said stem, said screw plug having a screw head undersurface compressing said stem annular sealing surface when said screw plug is sufficiently torqued into said central aperture.

2. The centrifuge tube and seal of claim 1 further comprising means on an exterior surface of said support crown for removing said support crown, said screw plug and said tube as a unit from a rotor of a centrifuge.

3. The centrifuge tube and seal of claim 1 wherein screw threads of said screw plug self-taps a wall bounding said stem central aperture.

4. The centrifuge tube and seal of claim 1 wherein said screw plug screw head undersurface is conical and an inner annular edge of said stem is compressed by said conical surface.

5. The centrifuge tube and seal of claim 1 further including a chamfer around an entrance of said central aperture adjacent said sealing surface and an O-ring seal between said screw plug head undersurface and said chamfer for secondarily sealing said stem.

6. The centrifuge tube and seal of claim 1 further including an integral V-shaped ring extending from said screw plug head underside, said ring being screwable into and compressing said sealing surface.

7. The centrifuge tube and seal of claim 1 further comprising a ring seal extending between stem annular sealing surface and said screw heading undersurface.

8. The centrifuge tube and seal of claim 1 in which said stem central aperture is pretapped prior to insertion of said screw plug.

9. The centrifuge tube and seal of claim 1 further comprising a counterbore in said support crown, said counterbore having sidewalls adjacent peripheral edges of said screw plug confining a head of said screw plug for preventing movement of said screw plug during centrifuging of a liquid within said tube.

10. The centrifuge tube and seal of claim 1 further comprising a seal cap sealing attached to said support crown and extending over and in restraining contact with a screw head top surface of said screw plug.

11. The centrifuge tube and seal of claim 1 in which said support crown includes an integral cap portion extending over said stem and said screw plug after said screw plug has been inserted into said step.

12. In combination, a rotary centrifuge and the centrifuge tube and seal of claim 1, said centrifuge having a centrifuge tube-holding cylindrical aperture for insertion of said centrifuge tube: a counterbore shoulder in said aperture and wherein said support crown includes a bottom peripheral edge portion abutting said counterbore shoulder when said centrifuge tube and support crown are inserted into said centrifuge aperture.

13. In combination, a fractionation plug and the centrifuge tube and seal of claim 1, said fractionation plug comprising a threaded boss insertable into said stem central aperture after removal of said screw plug therefrom and means including an outlet bore for removing centrifuged contents of said centrifuge tube from said centrifuge tube.

14. The fractionation plug of claim 13 further comprising a central translatable tube extending within said centrifuge tube and having an outer end of sufficient length to be positional at any interior level of said centrifuge tube.

15. The fractionation plug of claim 13 further comprising an inlet bore for conveying a liquid sample displacement fluid to said centrifuged contents of said centrifuge tube for removal of said contents through said outlet bore.

16. The fractionation plug of claim 13 further comprising means on said fractionation plug surrounding said threaded boss for sealing with the annular sealing surface of said filler stem.

17. The fractionation plug of claim 13 further comprising a vise for holding said tube stem while said threaded boss is inserted into said stem central aperture.

* * * * *